US007937703B2

(12) United States Patent
Bethea et al.

(10) Patent No.: US 7,937,703 B2
(45) Date of Patent: May 3, 2011

(54) STATELESS SERVER-SIDE AUTOMATION OF WEB SERVICE REQUESTS USING DYNAMICALLY GENERATED WEB SERVICE INTERFACES

(75) Inventors: Timothy Joel Bethea, Sunnyvale, CA (US); Monika Mojgan Gorkani, San Jose, CA (US); Cynthia Marie Roberts, San Jose, CA (US); Soumitro Tagore, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1363 days.

(21) Appl. No.: 11/237,147

(22) Filed: Sep. 27, 2005

(65) Prior Publication Data

US 2007/0074215 A1 Mar. 29, 2007

(51) Int. Cl.
*G06F 9/46* (2006.01)
*G06F 3/00* (2006.01)
*G06F 15/16* (2006.01)
*G06F 13/00* (2006.01)

(52) U.S. Cl. ......... 718/101; 709/248; 719/313; 711/147

(58) Field of Classification Search .................. 718/101; 709/248; 719/313; 711/147
See application file for complete search history.

(56) References Cited

U.S. PATENT DOCUMENTS

| 6,125,391 | A | 9/2000 | Meltzer et al. |
| 6,615,253 | B1 * | 9/2003 | Bowman-Amuah .......... 709/219 |
| 7,185,342 | B1 * | 2/2007 | Carrer et al. ................... 719/313 |
| 2003/0182278 | A1 * | 9/2003 | Valk ................................. 707/3 |
| 2004/0158685 | A1 * | 8/2004 | Jones et al. ................... 711/147 |
| 2005/0080930 | A1 * | 4/2005 | Joseph .......................... 709/248 |

* cited by examiner

*Primary Examiner* — Kenneth Tang
(74) *Attorney, Agent, or Firm* — Patterson & Sheridan, LLP

(57) ABSTRACT

Methods, computer programs, and systems for processing a request through a web service on a server are provided. The method includes receiving a batch request from a client. The batch request includes a plurality of sub-requests that each specifies an operation to be performed by the web service. The method further includes processing the batch request through the web service including performing the operation specified by each of the plurality of sub-requests and generating a corresponding plurality of sub-replies. Each sub-reply contains result data of the processing of a corresponding sub-request. The method further includes constructing a batch reply including the plurality of sub-replies, and returning the batch reply to the client.

7 Claims, 4 Drawing Sheets

STATELESS SERVER-SIDE AUTOMATION OF WEB SERVICE REQUESTS USING DYNAMICALLY GENERATED WEB SERVICE INTERFACES

FIELD OF THE INVENTION

The present invention relates generally to web services, and methods for implementing server-side automation of web service requests.

BACKGROUND OF THE INVENTION

A service-oriented architecture (SOA) is essentially a collection of services that communicate with one another. The communication can involve simple passing of data or can involve two or more services coordinating a task. In the SOA paradigm, the relationship between a service consumer (client) and a service provider (server) is generally considered to be loosely-coupled, in that no state is assumed to be maintained. This scheme, therefore, calls for means of communication which requires that each message (or request) sent from a client to a server contain instructions for performing a task and also any information needed to perform the task. The server performs the function described in the request, and returns a reply message. In this way, the server provides a service in which a specific functionality is available on demand.

Web services, as examples of SOA, are characterized by an ability to provide interfaces to services. The interfaces are typically built using open standards such as XML (eXtensible Markup Language), SOAP (Simple Object Access Protocol), and WSDL (Web Services Description Language), and make use of an internet protocol, such as the HTTP (Hypertext Transfer Protocol), for communication. Generic interfaces provided by web services have been widely adopted due to ease of implementation, however, performance or efficiency concerns of web services generally have not been addressed. Additionally, web services do not provide a basis for a client developer to automate common tasks, which could be highly useful for complex web services that offer rich functionality.

When depending upon web services as an application interface performance can be a problem as almost all communication occurs through, for example, exchanges of text-based messages over the web. While using web services as an application interface provides for accessibility and interoperability between two or more applications, such an architecture requires a complete round-trip—i.e., a request to a server followed by a reply to a client—for each individual request. In cases where a client application repeats an operation several times or where a client performs a series of commonly used operations a round-trip for each request generally increases the time spent on the overall operation.

A useful characteristic of web services is the ability to abstract functionality into smaller services, as this allows for fully self-contained requests to the service. This characteristic has the effect of decreasing the interdependence of a client and a server within a client-server relationship, as state need not be maintained on either client or server during the execution of a request. This is an essential feature as the web itself is a volatile medium and requests cannot be guaranteed to always reach a destination. A negative aspect of abstracting functionality into smaller services, however, becomes apparent due to increased time for a complex web service to perform a variety of operations that are used in a complementary manner with one another. In a case where a client application must implement a pre-defined sequence of operations (each corresponding to a request to a web service) that constitute a single piece of business logic, minimizing the number of round trips to the server would not only improve performance, but also permit a client developer to export the business logic to the server side by creating a batch request to represent the business logic.

A primary drawback to creating any sort of automation of web service requests is the necessity of having to maintain state in the relationship between a client and a server. In other words, in order to implement a system in which multiple operations can be performed sequentially to form an abstraction for larger operations, state must be introduced at some point on either the client or the server to maintain the request sequence and data flow between requests. Maintaining state, however, is contradictory to the intent and purposes of SOA and web services and is, therefore, not a desirable solution.

Accordingly, what is needed is a mechanism for providing stateless automation for web service requests that is compatible with the SOA paradigm and web services. The present invention addresses such a need.

BRIEF SUMMARY OF THE INVENTION

In general, in one aspect, this specification describes a method for processing a batch request through a web service on a server. The method includes receiving a batch request from a client. The batch request includes a plurality of sub-requests that each specifies an operation to be performed by the web service. The method further includes processing the batch request through the web service including performing the operation specified by each of the plurality of sub-requests and generating a corresponding plurality of sub-replies. Each sub-reply contains result data of the processing of a corresponding sub-request. The method further includes constructing a batch reply including the plurality of sub-replies, and returning the batch reply to the client.

Particular implementations can include one or more of the following features. A first sub-request of the plurality of sub-requests can include a storage attribute indicating that result data of processing the first sub-request should be stored. The method can further include creating a temporary buffer, and storing the result data of processing the first sub-request in the temporary buffer. The method can further include using the result data stored in the temporary data as input to a second sub-request when processing the second sub-request, in which the second sub-request is of the plurality of sub-requests. Using the result data stored in the temporary data buffer can further include transforming the result data into a form suitable for input to the second sub-request. Transforming the result data can include transforming the result data using an XSLT transformation. The XSLT transformation can be stored in a XSLT library on the server. The XSLT transformation can be passed along with the second sub-request to the server. The method can further include clearing the temporary buffer of the result data when the batch reply is returned to the client.

In general, in another aspect, the specification describes a computer program product, tangibly stored on a computer readable medium, for processing a batch request through a web service on a server. The product comprises instructions operable to cause a programmable processor to process a batch request from a client through the web service. The batch request includes a plurality of sub-requests that each specifies an operation to be performed by the web service. The product further comprises instructions to construct a batch reply including the plurality of sub-replies, and provide the batch reply to the client.

In general, in another aspect, the specification describes a system including a server operable to provide a web service, and a client operable to generate a batch request. The batch request includes a plurality of sub-requests that each specifies an operation to be performed by the web service. The web service is operable to receive the batch request from the client and process the batch request through the web service including performing the operation specified by each of the plurality of sub-requests and generating a corresponding plurality of sub-replies. The web service is further operable to construct a batch reply including the plurality of sub-replies and return the batch reply to the client.

In general, a generic method for introducing batch functionality in a given web service is provided. Batch processing can be implemented as a peer function to existing functions offered by a web service. In this manner, the batch processing functions of the web service can be published and discovered by client applications using the web service. The concepts described in this specification involves implementing a batch "service" which offers dynamic automation of other requests offered by the web service at runtime. In one implementation, the specification for a batch request includes requests (or sub-requests) that are designated by the web service to be available for automation. Each of the requests available for inclusion in a batch request may be fully independent (and may include within the request any required data) or may depend on data generated by a preceding request.

To facilitate cases where requests are interdependent, the specification of the batch service describes a fornat for encoding instructions for storing and transferring result data between requests. A server-side implementation of a web-service providing batch request capability includes the ability, therefore, to store result data temporarily for each batch, and transform the result data as needed for input into a subsequent request. Accordingly, the state of result data is limited to requests contained within a given batch request (and moreover, only to requests "downstream" from the data-generating request since in one implementation described below each request (of a batch request) is processed sequentially). At the conclusion of each batch operation, any result data stored as a result of processing a request is discarded. This ensures that state is maintained on a per request basis consistent with the intent and purposes of SOA and web services.

Implementations may provide one or more of the following advantages. A system providing a web service containing a batch request capability extends the SOA paradigm. The system maintains the essential features of SOA and web services, including ease of implementation, and also provides a way for a client application to extend the capabilities of a service provider without requiring functional updates to the service provider itself. This allows a client developer to explore a wider variety of opportunities in terms of performance and efficiency, as well as in extensibility by allowing generic abstraction of functionality to the server. The client side enjoys performance advantages as well, as the sum of the time spent waiting for the result of a request to a service and the time spent sending a subsequent request to another service is obviated as both requests can be run on a server as part of a single composite request.

The details of one or more implementations are set forth in the accompanying drawings and the description below. Other features and advantages will be apparent from the description and drawings, and from the claims.

BRIEF DESCRIPTION OF SEVERAL VIEWS OF THE DRAWINGS

Like reference symbols in the various drawings indicate like elements.

DETAILED DESCRIPTION OF THE INVENTION

Implementations of the present invention relates generally to web services, and methods for implementing server-side automation of web service requests. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1:
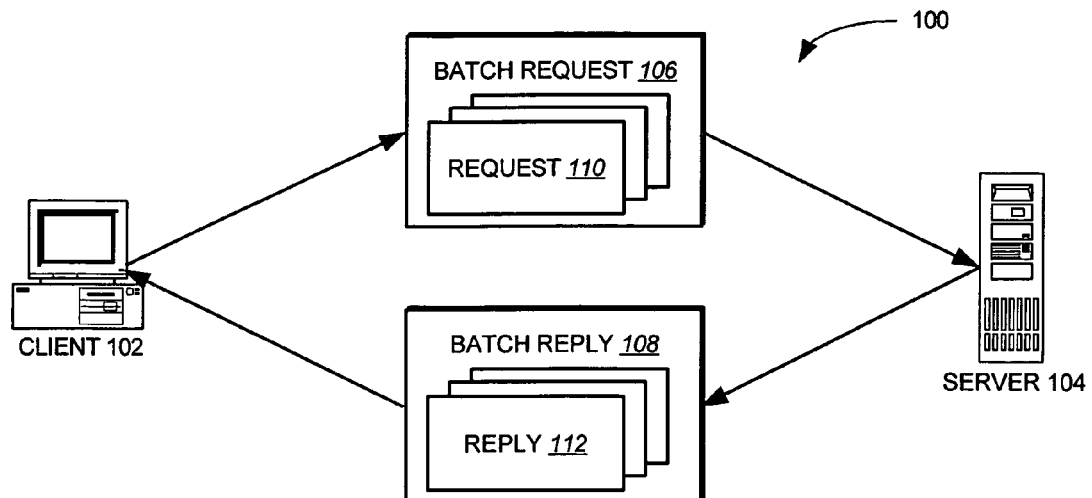
FIG. 1 is a block diagram of a system in accordance with one implementation of the invention.

FIG. 1 illustrates a system 100 providing a web service operable to process a batch request. In one implementation, system 100 includes a client 102 and a server 104. Though a single client 102 and a single server 104 are illustrated in FIG. 1 by way of example, system 100 can contain a different number of clients and servers. Client 102 is operable to create a batch request 106 that is sent to a web service provided by server 104. Server 104 processes batch request 106 and returns a batch reply 108 to client 102. Client 102 can be any type of computer system, including for example, a workstation, a desktop computer, a laptop computer, a personal digital assistant (PDA), a cell phone, and so on. Batch request 106 includes a plurality of requests (or sub-requests) 110, and batch reply 108 contains a plurality of corresponding replies (or sub-replies) 112.

In one implementation, a client application on client 102 creates batch request 106 in which each request 110 specifies independent operations—i.e., the results of processing a first request are independent of the processing of a second request—and, therefore, each request 110 is independent of one another. In another implementation, the client application creates a batch request 106 in which one or more requests 110 are dependent on one another—i.e., the results of processing a first request are used to process a second request.

Batch Request Including Independent Requests

An implementation in which the client application creates a batch request 106 including independent requests 110 will first be discussed. In this implementation, the client application inserts available requests into batch request 106. In one implementation, available requests are those requests described by a web developer in a WSDL published with a web service associated with server 104. Each (independent) request 110 within batch request 106 is sequentially and independently processed by the web service associated with server 104. The web service performs an operation to process each request 110 and generates a corresponding reply 112. The web service further generates a batch reply (e.g., batch reply 108) that contains all of the replies 112, and returns the batch reply to client 102.

Figure 2:
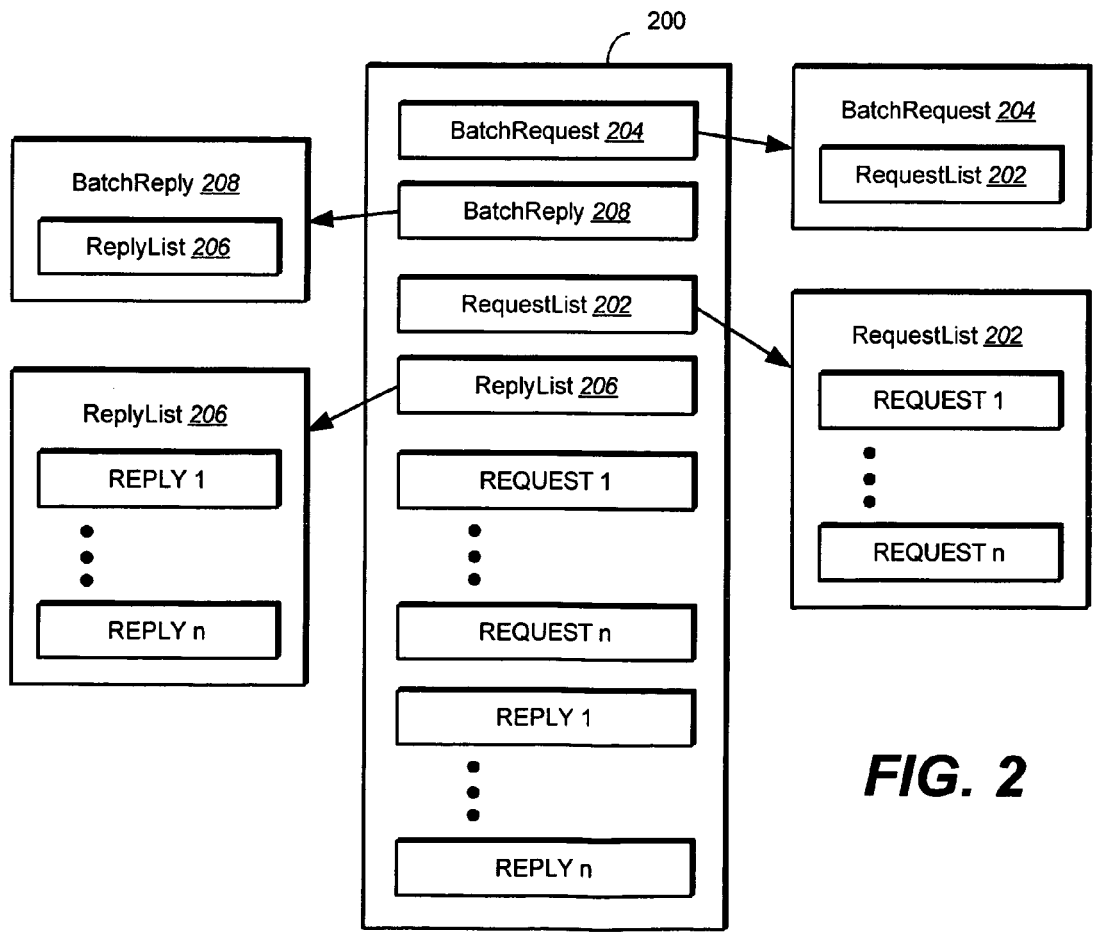
FIG. 2 illustrates a document describing a web service operable to process a batch request in accordance with one implementation of the invention.

FIG. 2 illustrates an example WSDL document 200 describing a web service operable to process a batch request that contains a plurality of requests, in which each request specifies an independent operation. A RequestList type 202 is defined within WSDL document 200 to include a reference for those requests (or request elements) which are intended to be available in batch requests. These requests are represented in FIG. 2 as requests 1-n. A BatchRequest element 204 is defined within WSDL document 200 to include a reference to RequestList type 202. BatchRequest element 204 represents a batch request containing a plurality of requests that each specifies an independent operation. That is, each request is self-contained with respect to data needed to process the request.

A similar scheme can be used for creating a batch reply. Accordingly, in one implementation, WSDL document 200 includes a ReplyList type 206 that is defined to include a reference for those replies (or reply elements) that are intended to be included within a batch reply. These replies are represented in FIG. 2 as replies 1-n. WSDL document 200 further includes a BatchReply element 208 that includes a reference to ReplyList type 206. BatchReply element 208 represents a batch reply containing a plurality of replies.

Batch Request Including Dependent Requests

An implementation in which a client application creates a batch request including one or more dependent requests will now be discussed. In this implementation, one or more of the requests within a batch request receives as input a result of processing a previous request. Accordingly, instructions for transferring the result of a given request to a subsequent request are, therefore, encoded into the batch request.

Figure 3:
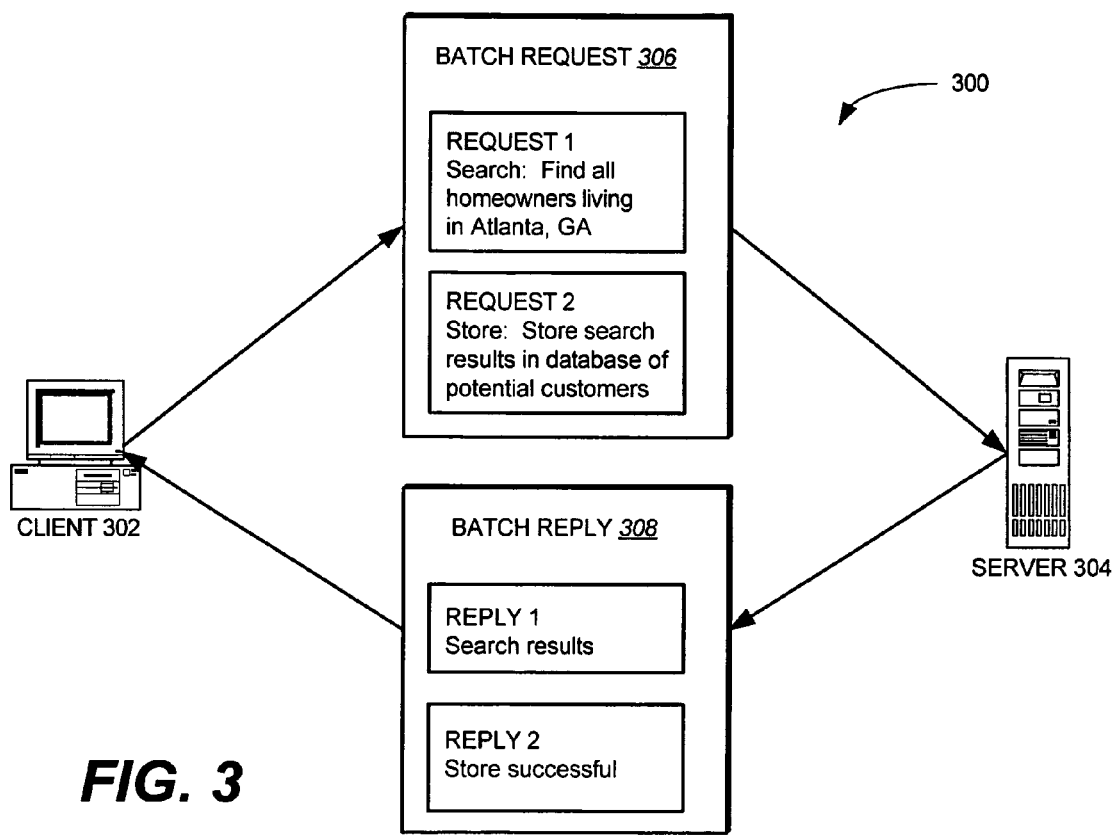
FIG. 3 illustrates a client sending a batch request to a web service in accordance with one implementation of the invention.

FIG. 3 illustrates a client 302 sending a batch request 306 to a web service on a server 304. In the example of FIG. 3, batch request 306 includes a first request (Request 1) for a web service to perform a search to find all homeowners living in Atlanta, Ga., and a second request (Request 2) for the web service to store the search results in a database of potential customers. In order for the web service to perform the second request, the results from processing the first request—i.e., the result data associated with the search results—must be transferred to the second request so that the result data can be stored in the database.

In one implementation, to permit data transfer between requests (e.g., Request 1 and Request 2), a WSDL document (e.g., WSDL document 200) includes a storage attribute that is associated with each request, which storage attribute specifies whether data should be stored after a corresponding request has been processed and a reply has been generated. If a storage attribute associated with a request indicates that result data (from processing the request) must be stored, then a temporary buffer (not shown) is allocated on the server (e.g., server 304) and the result data from processing the result is stored in the temporary buffer. The result data stored in the temporary buffer is then available for subsequent requests within a batch request to use until the batch request is completely processed by the web service. In one implementation, once the batch request has been processed, any result data stored in the temporary buffer is discarded.

Figure 4:
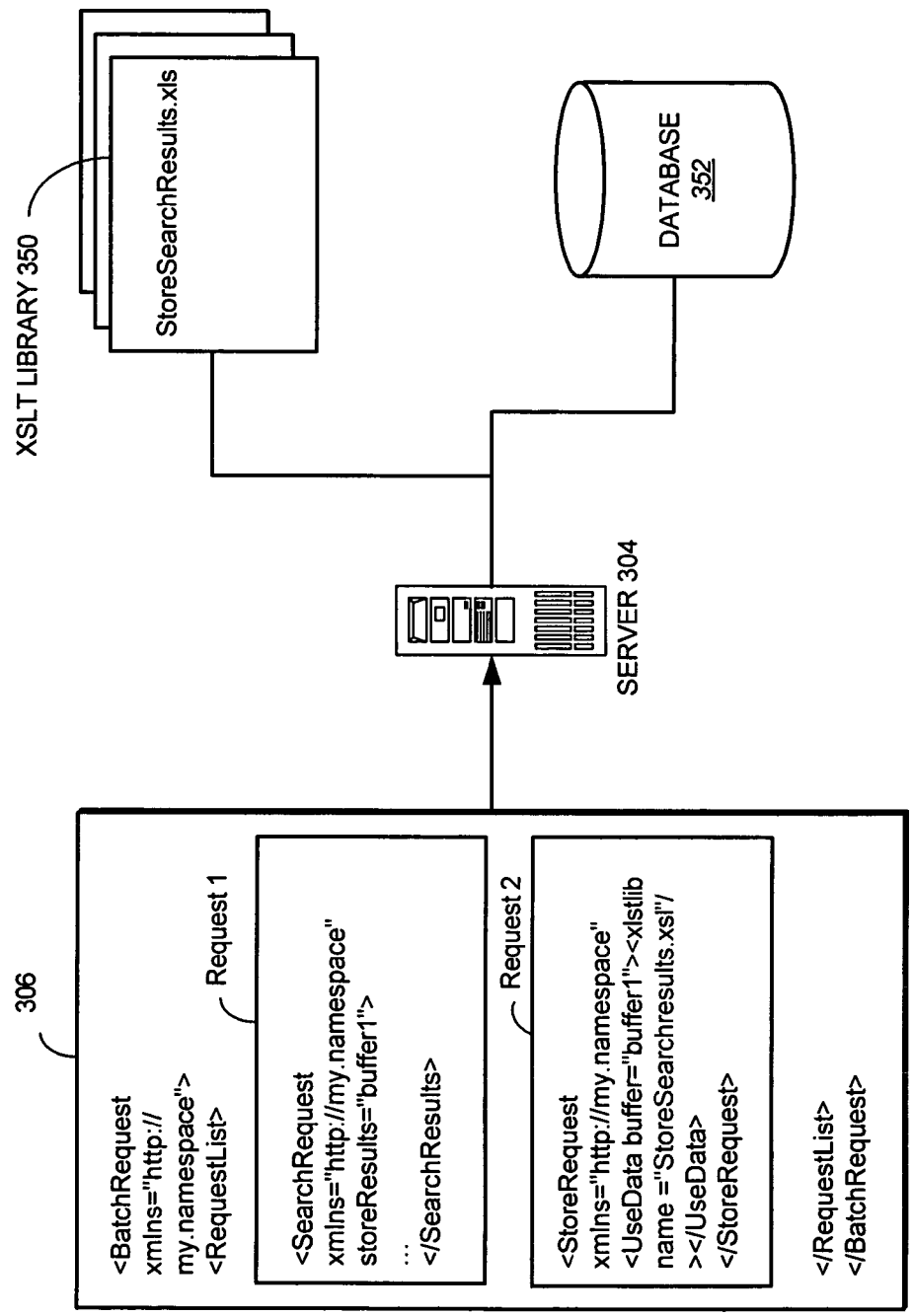
FIG. 4 illustrates storage and transformation of data associated with a request in accordance with one implementation of the invention.

In one implementation, a XSLT (eXtensible Stylesheet Language Transformation), a language for transforming XML documents into other XML documents, is used to transform data stored in a temporary buffer into a form suitable for input to a subsequent request, as illustrated in FIG. 4. By a web service maintaining a XSLT library (e.g., XSLT library 350) of XSLT documents (or passing a XSLT document as part of an input request), a client application need only to refer to a specific type of transformation to provide a way for result data (stored in the temporary buffer) to be correctly transformed for input to a given request. In another implementation, each request is defined and implemented such that the output (i.e., the result data) of one request is a valid input to another request and, therefore, the result data stored in the temporary buffer need not be transformed.

As shown in FIG. 4, batch request 306 has been expanded to include instructions that indicate whether the result data from the search request (i.e., Request 1) should be stored in a temporary buffer, and also instructions on how to transform the result data into a form suitable for input to a subsequent store request (i.e., Request 2). In particular, the search request includes instructions specifying that a temporary buffer "buffer1" is to be used to store result data associated with the search result. The store request includes instructions—i.e., a UseData section—that contains information related to where to retrieve the input data needed to process the store request. More specifically, the "xsltlib" tag within the UseData section of the store request specifies a particular type of transformation (or XSLT document)—StoreSearchResults.xsl—(which is part of XSLT library 350) that will be used to transform the result data stored in the temporary buffer "buffer1" to a form suitable for input to the store request.

As discussed above, an XSLT document can also be passed and included within a request itself, such as when a suitable transformation document is not already available on the server, or where a custom transformation is needed. Once the store request has been processed by the web service, the data associated with the search results are committed to a database 352. At this point (and referring back to FIG. 3), replies (i.e., reply 1 and reply 2) of the search request and the store request are respectively inserted into batch reply 308, and batch reply 308 is returned to client 302.

Figure 5:
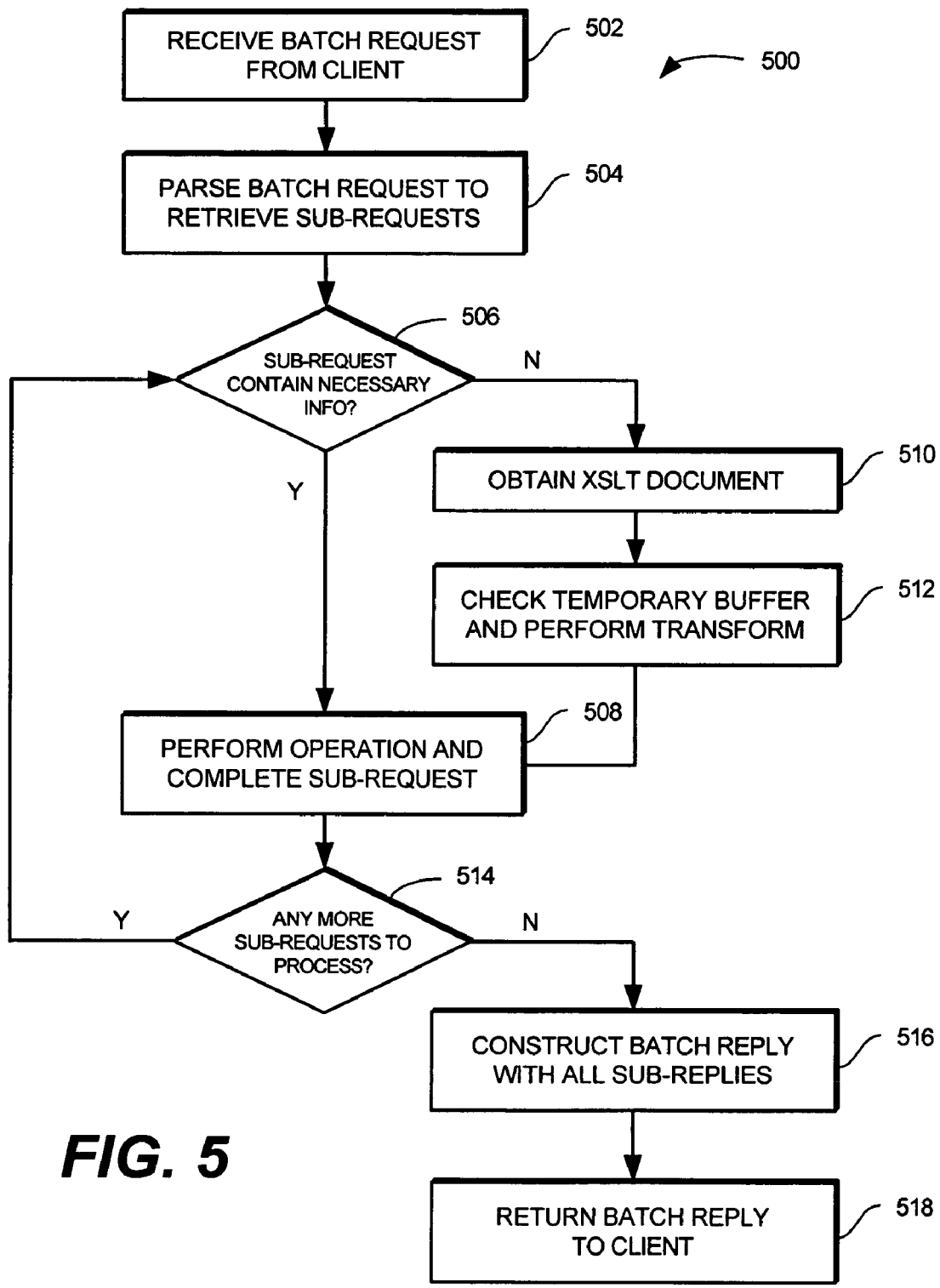
FIG. 5 illustrates a method for processing a batch request in accordance with one implementation of the invention.

FIG. 5 illustrates a method for processing a batch request (e.g., batch request 306) from the perspective of a web service on a server. A batch request is received (e.g., by a web service on a server 304) from a client (step 502). The batch requests can include independent sub-requests and/or dependent sub-requests. The batch request is parsed to retrieve each sub-request (step 504). For each sub-request, a determination is made whether the sub-request contains all the information necessary to perform an operation specified by the sub-request (step 506). If the sub-request contains the necessary information needed to perform the operation specified by the sub-request, the sub-request is processed by the web service and the results of processing the sub-request are stored in a batch reply (step 508). Further, if a storage attribute associated with the sub-request indicates that the results of processing the sub-request should be stored, then the results are stored in a temporary buffer (e.g., temporary buffer "buffer1").

If the sub-request does not contain the necessary information needed to perform the operation specified by the sub-request, and if the sub-request includes instructions indicating that a transformation (e.g., an XSL transformation) is needed, then an XSLT document is obtained (step 510). In one implementation, the XSLT document is stored in an XSLT library on the server. Alternatively, the XSLT document can be passed to the server along with the sub-request. The temporary buffer is checked for data (i.e., result data from processing of a previous request) and a transformation is performed on the data (step 512). The transformation transforms the data stored in the temporary buffer into a form suitable for input to the sub-request. In one implementation, if the data required by the sub-request is not contained within the temporary buffer, or if an error occurs while transforming the data stored in the temporary buffer, then an error response is generated an appended to the batch reply. If the transformation of the data in the temporary buffer is successful, then the operation specified by the sub-request is performed using the transformed data (step 508).

A determination is made as to whether there are any more sub-requests to process (step 514). If there are additional sub-requests within the received batch reply, then the method returns to step 506. If there are no additional sub-requests to process, then a batch reply is constructed with all of the sub-replies (step 516). In addition, the temporary buffer is cleared of all result data. The batch reply is then returned to the client (step 518).

Processors suitable for the execution of a computer program or a computer program product include, by way of example, both general and special purpose microprocessors, and any one or more processors of any kind of digital computer. Generally, a processor will receive instructions and data from a computer readable medium, e.g., a read-only memory or a random access memory or both. The essential elements of a computer are a processor for executing instructions and a computer readable medium—e.g., one or more memory devices—for storing instructions and data. Generally, a computer will also include, or be operatively coupled to receive data from or transfer data to, or both, one or more mass storage devices for storing data, e.g., magnetic, magneto-optical disks, or optical disks. Information carriers or computer readable media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Various implementations for processing a batch request through a web service on a server have been described. Nevertheless, one or ordinary skill in the art will readily recognize that there that various modifications may be made to the implementations, and any variation would be within the spirit and scope of the present invention. For example, the steps of methods discussed above can be performed in a different order to achieve desirable results. In addition, certain features described (such as allowing for both independent and dependent requests) may be omitted depending on the needs and features of a given web service implementation. Finally, given the nature of the various specifications for SOA and Web Service technologies, such as the constructions of WSDL definitions, there will be a variety of possible techniques for accomplishing a given design goal. For example, there are various possible methods for constructing a WSDL file to define a batch service request. Accordingly, many modifications may be made by one of ordinary skill in the art without departing from the spirit and scope of the following claims.

What is claimed is:

1. A method for processing a batch request through a web service on a server, the method comprising:
    processing a batch request from a client through the web service, the batch request including a plurality of sub-requests that each specify an operation to be performed by the web service, the processing including performing the operation specified by each of the plurality of sub-requests and generating a corresponding plurality of sub-replies, wherein a first sub-request of the plurality of sub-requests includes a storage attribute indicating that result data of processing the first sub-request should be stored in a temporary buffer, and wherein a second sub-request of the plurality of sub-requests includes an input attribute indicating that the result data should be used as input to the second sub-request;
    creating the temporary buffer on the server;
    storing the result data of processing the first sub-request in the temporary buffer on the server;
    transforming the result data in the temporary buffer on the server into a form suitable for input to the second sub-request, wherein transforming the result data retrieved from the temporary buffer on the server into a form suitable for input to the second sub-request includes transforming the result data using an XSLT transformation;
    retrieving the transformed result data stored in the temporary buffer on the server;
    passing the transformed result data as input to the second sub-request when processing the second sub-request to generate a second sub-reply, the second sub-reply corresponding to the processing of the second sub-request;
    constructing a batch reply including the plurality of sub-replies;
    providing the batch reply to the client; and
    clearing the temporary buffer of the result data when the batch reply is returned to the client to ensure that state is maintained on a per request basis.

2. The method of claim 1, wherein the XSLT transformation is stored in a XSLT library on the server.

3. The method of claim 1, wherein the XSLT transformation is passed along with the second sub-request to the server.

4. A non-transitory computer readable medium storing a program product for processing a batch request through a web service on a server, the program product comprising instructions operable to cause a programmable processor to:
    process a batch request from a client through the web service, the batch request including a plurality of sub-requests that each specifies an operation to be performed by the web service, the instructions to process further including instructions to perform the operation specified by each of the plurality of sub-requests and generate a corresponding plurality of sub-replies, wherein a first sub-request of the plurality of sub-requests includes a storage attribute indicating that result data of processing the first sub-request should be stored in a temporary buffer, and wherein a second sub-request of the plurality of sub-requests includes an input attribute indicating that the result data should be used as input to the second sub-request;
    create the temporary buffer on the server;
    store the result data of processing the first sub-request in the temporary buffer on the server;
    transform the result data in the temporary buffer into a form suitable for input to the second sub-request, wherein the instructions to transform the result data retrieved from the temporary buffer on the server into a form suitable for input to the second sub-request include instructions to transform the result data using an XSLT transformation;
    retrieve the transformed result data stored in the temporary buffer on the server;
    pass the transformed result data as input to the second sub-request when processing the second sub-request to generate a second sub-reply, the second sub-reply corresponding to the processing of the second sub-request;
    construct a batch reply including the plurality of sub-replies;
    provide the batch reply to the client; and clear the temporary buffer of the result data when the batch reply is returned to the client to ensure that state is maintained on a per request basis.

5. The non-transitory computer readable medium of claim 4, wherein the XSLT transformation is stored in a XSLT library on the server.

6. The non-transitory computer readable medium of claim 4, wherein the XSLT transformation is passed along with the second sub-request to the server.

7. A system comprising:
a server computing system configured to provide a web service;
a client to generate a batch request, the batch request including a plurality of sub-requests that each specifies an operation to be performed by the web service, wherein a first sub-request of the plurality of sub-requests includes a storage attribute indicating that result data of processing the first sub-request should be stored in a temporary buffer, and wherein a second sub-request of the plurality of sub-requests includes an input attribute indicating that the result data should be used as input to the second sub-request; and
the web service configured to receive the batch request from the client and process the batch request through the web service including performing the operation specified by each of the plurality of sub-requests and generating a corresponding plurality of sub-replies, the web service further configured to:
create the temporary buffer on the server,
store the result data of processing the first sub-request in the temporary buffer on the server,
transform using an XSLT transformation the result data in the temporary buffer into a form suitable for input to the second sub-request,
retrieve the transformed result data stored in the temporary buffer on the server;
pass the transformed result data as input to the second sub-request when processing the second sub-request to generate a second sub-reply, the second sub-reply corresponding to the processing of the second sub-request,
construct a batch reply including the plurality of sub-replies,
return the batch reply to the client, and
clear the temporary buffer of the result data when the batch reply is returned to the client to ensure that state is maintained on a per request basis.

* * * * *